US009836433B1

(12) United States Patent
Hoke et al.

(10) Patent No.: US 9,836,433 B1
(45) Date of Patent: Dec. 5, 2017

(54) IMAGE PROCESSING USING MULTIPROCESSOR DISCRETE WAVELET TRANSFORM

(75) Inventors: Jaclyn A. Hoke, Marion, IA (US); David W. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 874 days.

(21) Appl. No.: 13/437,260

(22) Filed: Apr. 2, 2012

(51) Int. Cl.
*G06K 9/54* (2006.01)
*G06F 17/14* (2006.01)
*G06T 7/30* (2017.01)
*G06T 1/20* (2006.01)
*G06T 5/00* (2006.01)

(52) U.S. Cl.
CPC .............. *G06F 17/148* (2013.01); *G06T 7/30* (2017.01); *G06T 1/20* (2013.01); *G06T 5/002* (2013.01); *G06T 5/003* (2013.01); *G06T 5/007* (2013.01)

(58) Field of Classification Search
USPC .......... 348/43, 46, 222.1; 359/690; 375/347; 382/100, 128, 131, 132, 141, 166, 190, 382/232, 233, 240, 274; 702/179
See application file for complete search history.

(56) References Cited

U.S. PATENT DOCUMENTS

| | | | |
|---|---|---|---|
| 5,717,791 A * | 2/1998 | Labaere et al. ............... 382/274 |
| 6,937,773 B1 * | 8/2005 | Nozawa ............... H04N 19/139 375/240.08 |
| 7,068,851 B1 * | 6/2006 | Berkner ............... 382/261 |
| 7,206,459 B2 * | 4/2007 | Berkner et al. ............... 382/251 |
| 7,239,424 B1 * | 7/2007 | Berkner et al. ............... 382/232 |
| 7,277,118 B2 * | 10/2007 | Foote ............... G06T 3/4038 348/218.1 |
| 7,545,988 B2 * | 6/2009 | Meeker ............... 382/232 |
| 7,609,297 B2 * | 10/2009 | Master et al. ............... 348/222.1 |
| 7,778,367 B1 * | 8/2010 | Stockmaster ............... 375/347 |
| 7,778,484 B2 * | 8/2010 | Fu ............... 382/275 |
| 8,116,579 B2 * | 2/2012 | Fenney et al. ............... 382/240 |
| 8,170,334 B2 * | 5/2012 | Balster et al. ............... 382/166 |
| 8,295,632 B2 * | 10/2012 | Fattal ............... 382/266 |
| 8,406,542 B2 * | 3/2013 | Ikeda ............... H04N 19/647 382/233 |
| 8,503,778 B2 * | 8/2013 | Sim ............... G06T 5/008 382/172 |
| 8,792,553 B2 * | 7/2014 | Mallat ............... G06T 5/001 375/240.12 |
| 8,824,833 B2 * | 9/2014 | Dagher et al. ............... 382/294 |
| 8,842,940 B1 * | 9/2014 | Gee et al. ............... 382/302 |
| 9,196,188 B2 * | 11/2015 | Kimura ............... G09G 3/2022 |
| 2004/0156528 A1 * | 8/2004 | Joo et al. ............... 382/100 |
| 2006/0056056 A1 * | 3/2006 | Ahiska et al. ............... 359/690 |
| 2008/0247638 A1 * | 10/2008 | Tanida ............... G06T 7/0065 382/154 |
| 2009/0116685 A1 * | 5/2009 | Yoo et al. ............... 382/100 |
| 2009/0136083 A1 * | 5/2009 | Picard et al. ............... 382/100 |
| 2009/0290779 A1 * | 11/2009 | Knapp et al. ............... 382/132 |
| 2010/0142790 A1 * | 6/2010 | Chang ............... 382/132 |

(Continued)

*Primary Examiner* — Xuemei Chen
(74) *Attorney, Agent, or Firm* — Angel N. Gerdzhikov; Donna P. Suchy; Daniel M. Barbieri

(57) ABSTRACT

The present invention relates to improved systems and methods of image processing and more particularly to improved systems and method of image processing using modified image data to produce enhanced data and images using fewer processing cycles and lower system power.

18 Claims, 5 Drawing Sheets

(56) References Cited

U.S. PATENT DOCUMENTS

| | | | |
|---|---|---|---|
| 2010/0266188 A1* | 10/2010 | Burns et al. | 382/132 |
| 2011/0182495 A1* | 7/2011 | Sun et al. | 382/141 |
| 2012/0189206 A1* | 7/2012 | Iketani | 382/190 |
| 2012/0197594 A1* | 8/2012 | Orth et al. | 702/179 |
| 2012/0224027 A1* | 9/2012 | Takada | 348/46 |
| 2012/0281927 A1* | 11/2012 | Arai | 382/233 |
| 2012/0321151 A1* | 12/2012 | Zohrer et al. | 382/128 |
| 2013/0002816 A1* | 1/2013 | Hannuksela et al. | 348/43 |
| 2013/0169801 A1* | 7/2013 | Martin | H04N 5/23206 348/143 |
| 2013/0243296 A1* | 9/2013 | Nandi et al. | 382/131 |
| 2013/0322728 A1* | 12/2013 | Jacobs et al. | 382/132 |
| 2014/0334743 A1* | 11/2014 | Bernard et al. | 382/274 |

* cited by examiner

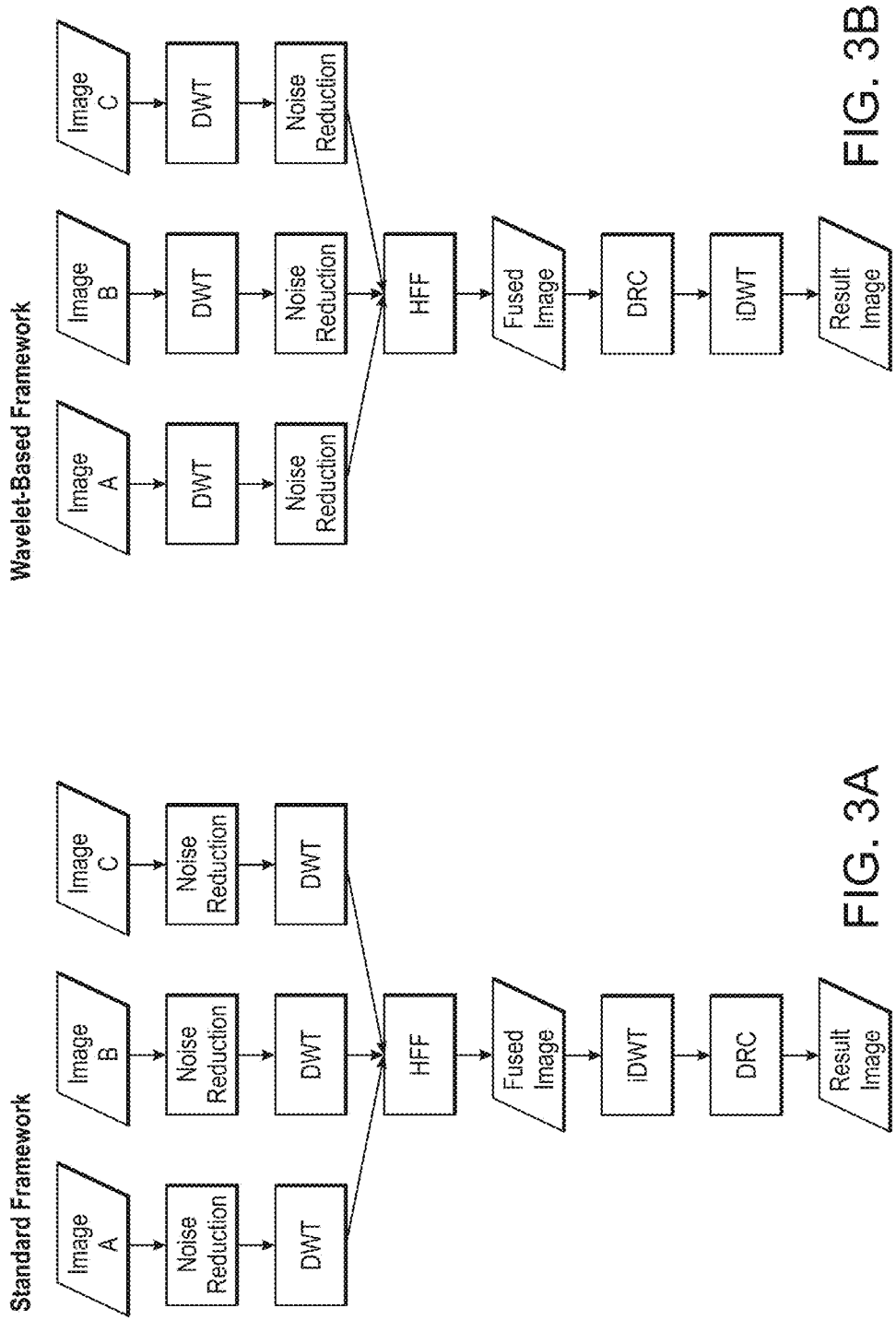

12-bit Input Image 8-bit Output Image

IMAGE PROCESSING USING MULTIPROCESSOR DISCRETE WAVELET TRANSFORM

CROSS REFERENCE TO RELATED APPLICATIONS

This application relates to the following applications filed on even date herewith and each incorporated herein by these references in their entirety, including Multiprocessor Discrete Wavelet Transform by John K. Gee et al. (Ser. No. 12/572,600), Custom Efficient Optical Distortion Reduction System and Method by David W. Jensen, Richard D. Tompkins and Susan Robbins (Ser. No. 12/572,669), Multiple Aperture Video Imaging System by David W. Jensen and Steven E. Koenck (Ser. No. 12/572,492).

FIELD OF THE INVENTION

The present invention relates to improved systems and methods of image processing and more particularly to improved systems and method of image processing using modified image data to produce enhanced data, such as enhanced images.

BACKGROUND OF THE INVENTION

Current forms of data enhancement are computationally complex and therefore slow. This is particularly problematic in the area of image and video processing where slow computation leads to jumpy or otherwise unacceptable video play back rates. Several methods have been suggested to speed up the processing; however, each is high cost or otherwise does not provide a sufficient increase in speed to justify the increased cost.

One area that adds to the complexity in current data enhancement systems and related methods is due to the fact that multiple processes are applied to the data, often introducing performance delay and latencies unacceptable for many of real time applications.

The present invention overcomes one or more of these problems and has application across multiple domains, including persistent surveillance, medical imaging, astronomy, commercial avionics and soldier vision systems.

SUMMARY OF THE INVENTION

The present invention includes an image processing system with several data enhancement processing units, such as image processors, connected together with a communication bus or network. Each data enhancement processing unit includes the ability to apply two or more processing techniques, including one frequency-based technique, to transform the one or more wavelet coefficients into a set of modified wavelet coefficients representing an enhanced data set such as one representing an enhanced image and a memory that stores the one or more wavelet coefficients. In one embodiment an image processor includes a wavelet transform processing unit that decomposes data from an image into one or more sets of wavelet coefficients using a discrete wavelet transform, a processor that applies two or more processing techniques, including one frequency-based technique, to transform the one or more sets of wavelet coefficients into a set of modified wavelet coefficients representing an enhanced image. A processor that transforms the set of modified wavelet coefficients into the enhanced image.

Another embodiment adds an address computation processing unit and a shared register file so that the wavelet transform processing unit decomposes data from one or more segments of an image into wavelets using a discrete wavelet transform. The shared register stores the intermediate wavelet coefficient computations. The address computation processing unit identifies addresses of wavelets to be decomposed by subsequent operation of the wavelet transform processing unit. The system also includes storage where the resultant wavelet coefficients from each segment may be stored.

The present invention also includes methods of data enhancement using one or more processors decomposing an data using a discrete wavelet transform on a wavelet transform processing unit to form one or more sets of wavelet coefficients, applying two or more processing techniques, including one frequency-based technique, to create an enhanced representative image by transforming one or more sets of wavelet coefficients into a set of modified wavelet coefficients representing the enhanced image, and transforming the set of modified wavelet coefficients into the enhanced image.

BRIEF DESCRIPTION OF THE DRAWINGS

In the drawings:

FIGS. 3a and 3b show an example standard and wavelet based framework with a select set of image processing algorithms for the present invention.

DETAILED DESCRIPTION

The present invention includes systems and methods for enhancing data sets, such as those that represent images that greatly reduce power and time costs while also providing high performance. In one embodiment of the present invention, the present invention provides a system and related methods that enhance resultant images using less power by limiting very time consuming due to the per-pixel nature of most computations. The present invention is also suitable for other types of data as will be evident below. In the present invention an image processing system and related method uses a discrete wavelet transform (DWT) to reduce the computational complexity while maintaining, or even improving, the resulting output.

The present invention results in an efficient method that provides performance benefits when there is a desire to use one or more (multiple) image processing algorithms. The present invention is well suited to a variety of applications. Since this system can efficiently accomplish the desired results by only performing the transformation once and then using the transformed data with multiple image enhancement algorithms, it has opened the door to an enhanced method that can use a transformation, to convert an image to a frequency and spatial representation. Following the application of multiple enhancement algorithms that are applied to the wavelet coefficients, a single transformation converts the data back to a normal image. Performing the enhancement algorithms on the wavelet coefficients improves the performance and reduces latency for the system. This approach can be extremely valuable for real-time applications.

Figure 1:
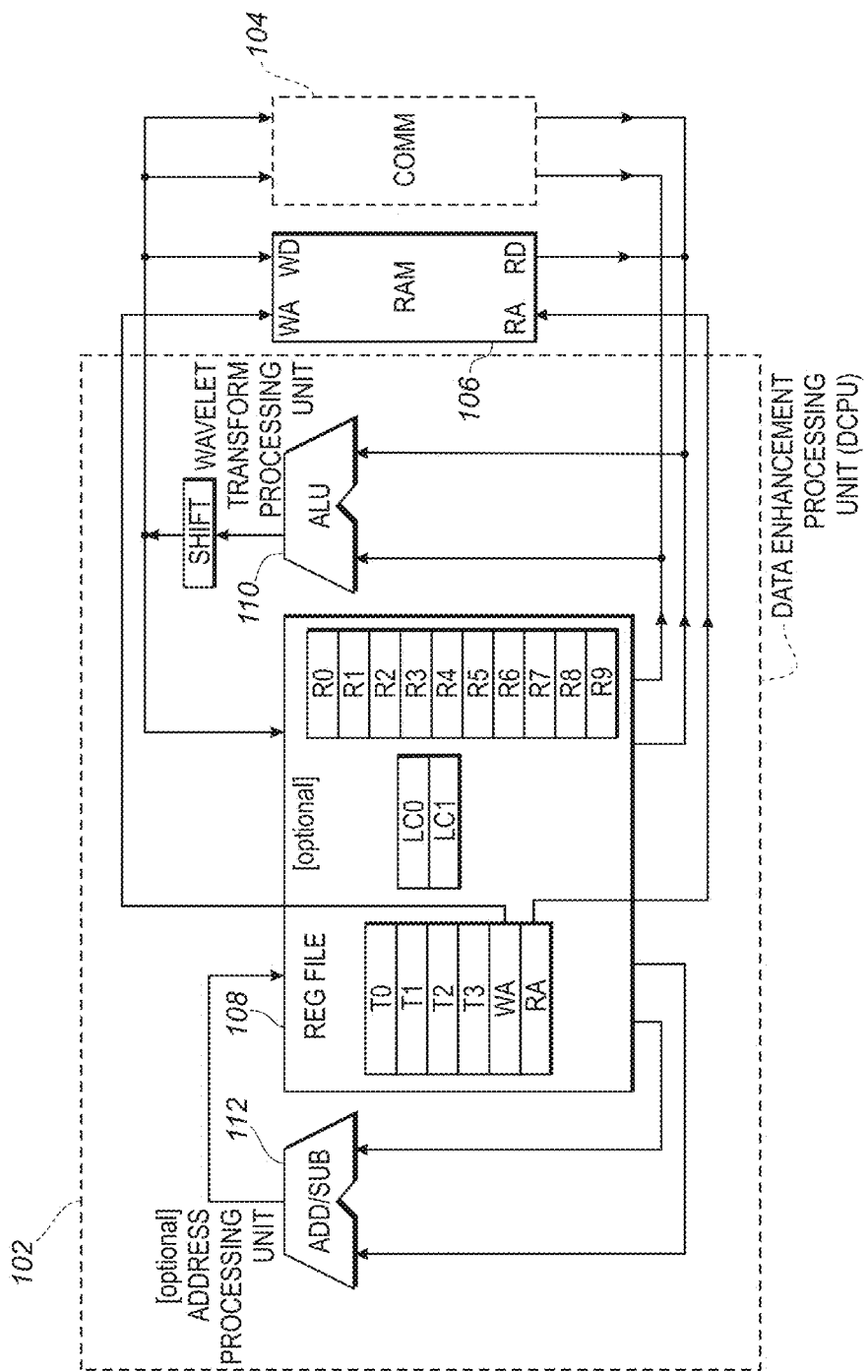
FIG. 1 shows schematically one data enhancement processing unit used in the systems of the present invention.

As seen in FIG. 1, the present invention includes an image processing system 101 that includes a decomposition processing unit 102, such as a data enhancement processing unit (DCPU) 102, that is suitable for image processing or similar processing of data including audio and information based data. The decomposition processing unit 102 decomposes data from one or more images into one or more sets of wavelet coefficients using transformation, such as the discrete wavelet transform. The system also has a memory 106 that stores the one or more sets of wavelet coefficients, a processing unit 110 that applies two or more processing techniques, including one frequency-based technique, to transform the one or more sets of wavelet coefficients into a set of modified wavelet coefficients representing one or more enhanced images. These processing unit(s) can have the ability to also transform the sets of modified wavelet coefficients into one or more enhanced images or, alternately the processing that transforms the sets of modified wavelet coefficients into one or more enhanced images can be a separate processor. The processing unit in one embodiment uses two or more temporal phases to perform the transforms on the sets of wavelet coefficients.

The processing unit may be a single general purpose processing unit that runs software to carry out the data enhancement algorithm discussed below. As would be well understood by one skilled the art, the processing unit is not limited to a single general purpose processor, but could alternately also be a multicore processor, or even handled by a hardware implementation independently or in combination.

In the alternative, the processing unit may be a purpose built processing unit that carries out the data enhancement algorithm discussed below. Purpose built is used to mean that data enhancement algorithm can be implemented in hardware or microcoded software on the processing unit. For example, an application specific integrated circuit (ASIC) could be a purpose build processing unit.

Also as seen in FIG. 1, the image processing systems of the present invention may also include other components commonly found in computer systems such as communications devices 104, displays, I/O devices, and the necessary buses to allow all the components to communicate with each other. The image processing system also includes storage, which may or may not be integrated or co-located with other components of the system. Storage includes memory registers, cache, RAM 106, memory or non-volatile storage such as hard drives.

Each data enhancement processing unit includes the ability to apply two or more processing techniques, including one frequency-based technique, to transform the one or more sets of wavelet coefficients into a set of modified wavelet coefficients representing an enhanced data set such as one representing an enhanced image and a memory that stores the one or more wavelet coefficients. In one embodiment an image processor includes a wavelet transform processing unit that decomposes data from an image into one or more sets of wavelet coefficients using a discrete wavelet transform, a processor that applies two or more processing techniques, including one frequency-based technique, to transform the one or more sets of wavelet coefficients into a set of modified wavelet coefficients representing an enhanced image.

The processing unit, in one embodiment, does at least need the wavelet transform processing unit (WTPU) 110 and the memory 106 capable of applying two or more processing techniques, including one frequency-based technique using a frequency-based algorithm for example a noise related algorithm, to transform the one or more sets of wavelet coefficients into a set of modified wavelet coefficients representing an enhanced data set representing an enhanced image with noise corrections using the memory 106 that stores the one or more sets of wavelet coefficients. It can also include a shared register 108 and an address computation processing unit (ACPU) 112 if needed.

The memory may take any form suitable and may include such things as cache, RAM or other non-volatile storage. The WTPU 110 decomposes the image data into wavelet coefficients to be used in the each decomposition as shown in FIG. 1 where the data enhancement processing unit (DCPU) 102 reads and writes data (wavelet coefficients) to and from the RAM 106 at the RD (read data) and WD (write data) ports. Preferably, the memory 106 is located on a chip with the processing unit and/or as part of the DCPU 102. The memory is accessible by both WTPU 110 and, optionally, the ACPU.

Figure 2:
FIG. 2 shows an unprocessed and a processed image according to the present invention.

The WTPU 110 decomposes the input data into wavelets using a discrete wavelet transform to form one or more wavelet coefficient and uses two or more processing techniques, including one frequency-based technique, to transform the one or more wavelet coefficients from an original image 120, for example as shown in FIG. 2 which will be discussed in more detail below, into a set of modified wavelet coefficients representing an enhanced image 124 that has more clarity then one that uses the conventional process as shown in conventional DWT image 122. This is due to the fact that the processor that transforms the set of modified wavelet coefficients into the enhanced image.

The present inventive method of data enhancement starts with decomposing data using a wavelet transform on a wavelet transform processing unit 110 to form one or more sets of wavelet coefficients. The wavelet transform can be a discrete wavelet transform or other wavelet transform such as a complex wavelet transform. Next the processor applies two or more processing techniques, including one frequency-based technique, to create an enhanced representative image, transforming one or more sets of wavelet coefficients into a set of modified wavelet coefficients representing the enhanced image. Finally the processor or processors transform the set of modified wavelet coefficients into the enhanced image.

In a preferred embodiment only one of each type of algorithm, in a multiple of applicable algorithms, are applied by the system. In one example the types of algorithms applied include, but are not limited to, one noise algorithm, a registration algorithm and one dynamic range compression algorithm.

In one embodiment the algorithms that will process image frames collected from sensors including but not limited to visible, low light, and infrared sensors. This embodiment could include various enhancements on the single image frame by applying one or more of algorithms such as but not limited to registration, distortion correction, feature recognition, noise reduction, contrast enhancement, multi-spectral fusion, multi-focus fusion (hands free focus), super-resolution, compression, and deblurring algorithm.

The method could include enhancements on a multiple image frames by applying one or more of algorithms such as but not limited to registration, distortion correction, feature recognition, noise reduction, contrast enhancement, multi-spectral fusion, multi-focus fusion (hands free focus), super-resolution, compression, and deblurring algorithm, and results in a single or multiple output frames. In another embodiment the method can be enhanced with a parallax-correcting registration step in conjunction to two or more input images by applying one or more registration algorithms to the low frequency data to obtain a coarse registration and using the high frequency coefficients to refine that coarse registration and then leveraging high frequency as a set of weights to select, register, and construct an output image.

In another embodiment the processing unit is multiple processors or hardware units that simultaneously perform the transforms on the sets of wavelet coefficients. The algorithms are used to process image frames collected from sensors including but not limited to visible, low light, and infrared sensors. The processing enhancements to a single image frame by applying one or more of algorithms such as but not limited to registration, distortion correction, feature recognition, noise reduction, contrast enhancement, multi-spectral fusion, multi-focus fusion (hands free focus), super-resolution, compression, and deblurring algorithm. The processing enhancements of multiple image frames by applying one or more of algorithms such as but not limited to registration, distortion correction, feature recognition, noise reduction, contrast enhancement, multi-spectral fusion, multi-focus fusion (hands free focus), super-resolution, compression, and deblurring algorithm; and results in a single or multiple output frames. The system can alternately further including a parallax-correcting registration step in conjunction to two or more input images by applying one or more registration algorithms to the low frequency data to obtain a coarse registration and using the high frequency coefficients to refine that coarse registration and then leveraging high frequency as a set of weights to select, register, and construct an output image.

Figures 4, 5, 7:
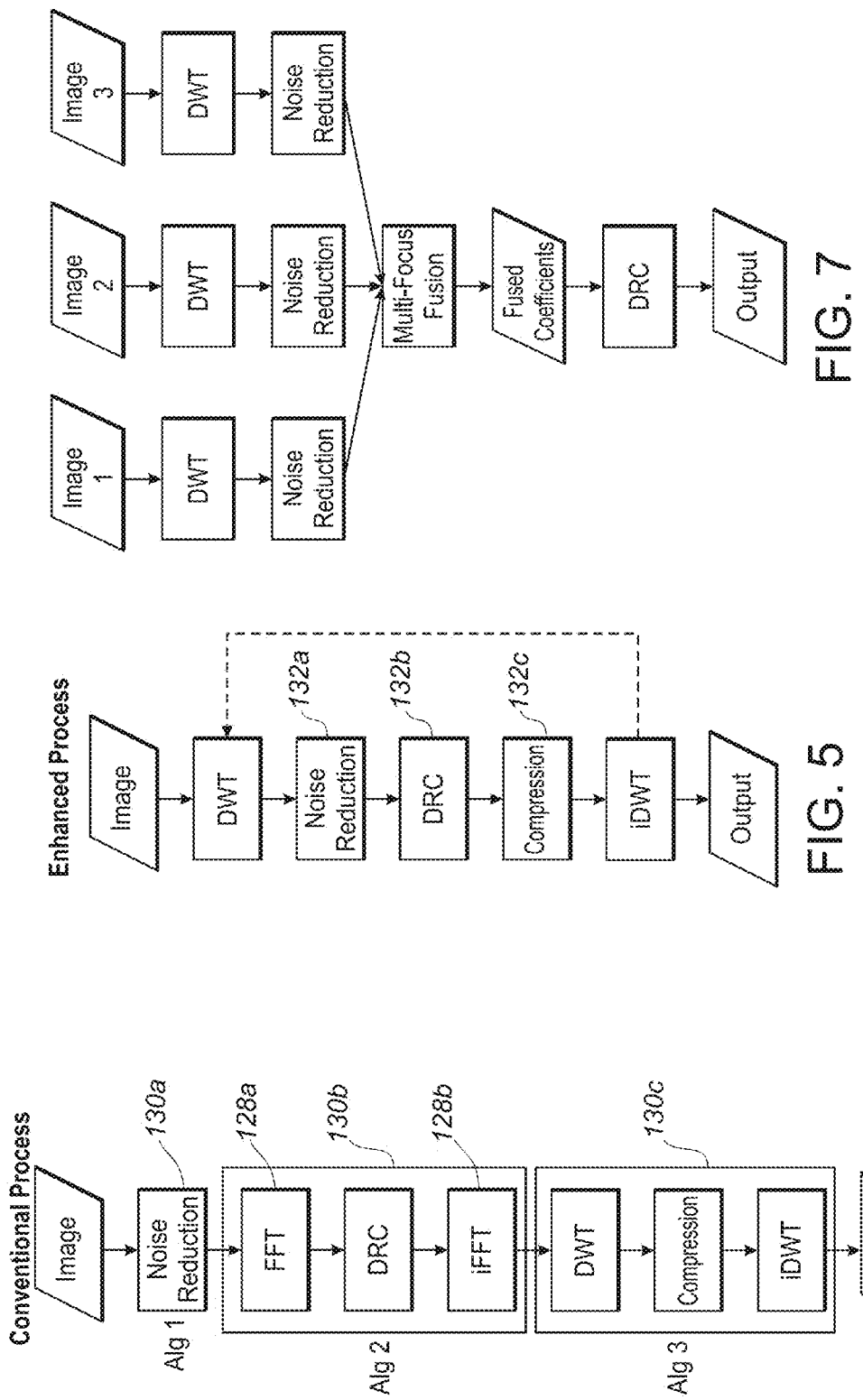
FIG. 4 shows schematically a conventional processing method.
FIG. 5 shows schematically the steps of one preferred data enhancement processing method used in the systems of the present invention.
FIG. 7 shows schematically the steps of another data enhancement processing method used in the systems of the present invention.

FIGS. 3a and 3b respectively, show an example of a standard framework and wavelet-based framework process each applying a subset of the possible image enhancement algorithms. The standard framework uses a conventional process, as shown in FIG. 4, wherein the various processing techniques 130a, 130b, 130c each are separately processed between data transform steps 128a and 128b. FIG. 5 shows the present invention of wavelet-based framework where two or more processing techniques 132a, 132b, 132c, including one frequency-based technique 132a in one preferred method, are grouped together and applied in series to the wavelet coefficients between the wavelet transform 128a and inverse wavelet transform 128b. This example applies a soft threshold to the coefficients to reduce image noise. Then the coefficients, as described in this application, perform dynamic range compression, and encode the coefficients to compress the image.

FIG. 5 also illustrates, with a dotted line, that there can be two or more passes of the transform when used in conjunction with an embodiment of the current invention. The transform processes entire rows and columns into low frequency and high frequency components. The low frequency data retains the essential image information and is shown in the bottom left corner of the image. The high frequency coefficients are stored in the other three quadrants and represent the gradient between adjacent pixels. Each pass of the DWT is recursively applied to the low frequency portion of the data of the previous pass. This recursion can be performed until only a single pixel of low frequency data remains.

In one preferred embodiment of the wavelet-based framework the enhancement method includes the steps of decomposing data from one or more images into one or more sets of wavelet coefficients using a discrete wavelet transform, storing the one or more sets of wavelet coefficients in memory, applying two or more processing techniques, including one frequency-based technique, to transform the one or more wavelet coefficients into a set of modified wavelet coefficients representing one or more enhanced images; and transforming the sets of modified wavelet coefficients into one or more enhanced images.

In the above embodiment and in others a Le Gall 5/3 Discrete Wavelet Transform (DWT) can be used, but any reversible transform can be applied. The DWT reversible transformation converts the image to a low frequency and high frequency mapping. The low frequency map contains down-sampled version of the original image. Using the smaller image improves the execution speed performance of searching algorithms such as registration and feature recognition. The high frequency map improves the execution speed performance of algorithms that reduce noise and enhance details in images. It is only necessary to perform the transformation once when using the enhanced processing method since multiple image enhancement algorithms can execute on the frequency domain representations. After performing the enhancement algorithms, a single transformation 128b converts the data back to a normal image. Applicable enhancement algorithms include, but are not limited to, registration, feature recognition, noise reduction, contrast enhancement, multi-spectral fusion, multi-focus fusion (hands free focus), super-resolution, compression, and deblurring.

Figure 6A:
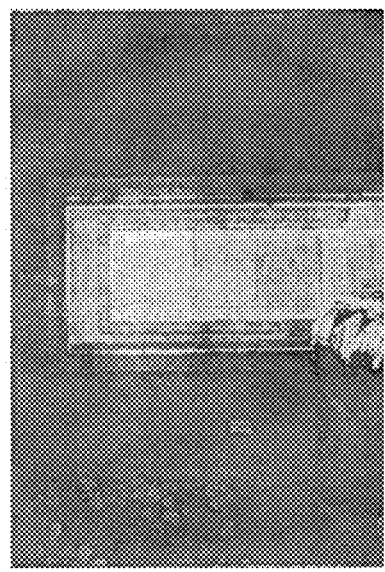
FIG. 6 shows schematically the results of one preferred data enhancement processing method used in the systems of the present invention.
Figure 6B:
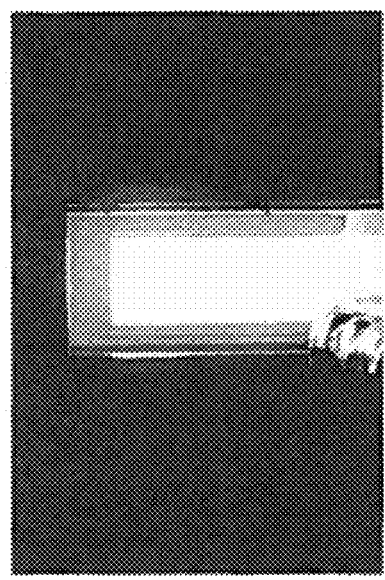

The enhanced data method has been successfully used by Rockwell Collins to perform Dynamic Range Compression (DRC) by modifying the coefficients as described above. FIGS. 6a and 6b illustrate that the 12-bit input image, as shown in FIG. 6a, is reduced to an 8-bit output image as shown in FIG. 6b using the present system and related method. The enhanced data process for modifying the coefficients includes, but is not limited to, scaling and zeroing, and can be applied to all or select coefficients. For example, simply scaling all coefficients (low frequency and high frequency) and performing the inverse transformation provides a good dynamic range image. Under one of our human factor assessments of multiple dynamic wave compression (DRC) algorithms, a histogram equalization algorithm approach produced some of the best visual results. By performing the DWT transformation it is possible to perform the histogram processing on only the low frequency data. The histogram processing runs much faster on the smaller set of pixels in the low frequency data. After performing the histogram equalization on the low frequency data, the inverse transformation was then performed using the original high frequency coefficients. The resulting image is comparable to (or better than) the original histogram equalization DRC image. Tests were run successfully using this DWT framework to perform Dynamic Range Compression (DRC) by modifying the coefficients.

In another embodiment shown in FIG. 7, image registration was also applied in a method described in more detail in an application entitled Multiprocessor Discrete Wavelet Transform by John K. Gee et al. (Ser. No. 12/572,600) which is hereby incorporated by reference. Registration of two similar images is a challenging and computationally intensive task. Registration algorithms have been well studied and applied to astronomy, medical, and satellite imagery. In our framework, these registration algorithms can be applied to the smaller low frequency representation of the images. These complex registration algorithms execute much faster in our framework. Because the algorithm is performed on a smaller version of the image, the resulting registration solution is only a coarse approximation. The high pass coefficients can be used to refine the coarse approximation found with the low pass coefficients. Often the registration algorithm runs in $O(n^2)$ or $O(n^3)$ execution time where n is the number of pixels. The refinement phase using the high pass coefficients runs in linear time, $O(n)$. This implies a significant reduction in execution time is possible using two passes (registration and refinement) with the low pass and high passes coefficients in our software framework.

This process is especially useful when working to correct for parallax and image discontinuities which can be created when the two images are captured from different viewpoints. Registration is even more challenging and computationally demanding in this case. The parallax created by this change in viewpoint often produces undesirable artifacts in the constructed output image. The enhanced data processing method of the present invention provides an innovative approach to construct the registered images and appropriately account for the parallax and image discontinuities.

The low frequency spatial representations of the images are leveraged to provide a coarse registration. The high frequency coefficients are used to refine that coarse registration. The high frequency coefficients of the two images are also used as a weighting scheme for guide and select appropriate regions of coefficients to apply to the registered low frequency images. Each level of high frequency coefficients guides the construction of the registered image. The larger coefficients are specifically chosen from between the two converted images to ensure the more detailed image data is captured in the constructed image.

Another embodiment of the system and related method, sometimes referred to as enhanced data processing, can be also used to help preserve edge information, as shown in FIG. 2. The image data representative of the image shown in FIG. 2 was processed into a set of modified wavelet coefficients representing the enhanced image 124. This is due to the fact that the processor that transforms the set of modified wavelet coefficients into the enhanced image that can preserve the edge data using a Complex Dual Tree DWT (CDT-DWT) process. This process uses a different type of wavelet decomposition that preserves additional edge information and has more robust anti-aliasing properties. FIG. 2 shows the sample results after the noise reduction algorithm from our DWT framework and MATLAB implementation of CDT-DWT was applied.

This system and method is not limited to the visible portion of the spectrum. It can be applied to data across the spectrum including (but not limited to) that in the visible, low light, and IR.

Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. An image processing system, the system comprising:
   a decomposition processor that utilizes a discrete wavelet transform to decompose data from one or more images into one or more sets of wavelet coefficients, the one or more sets of wavelet coefficients comprising a low frequency data set of wavelet coefficients that retains essential image information of the one or more images and one or more high frequency data sets of wavelet coefficients that represent gradient between adjacent pixels of the one or more images;
   a memory that stores the one or more sets of wavelet coefficients; and
   at least one processor configured to:
      apply two or more image enhancement processing techniques to provide processing enhancements to at least one of the one or more images, the two or more image enhancement processing techniques including one frequency-based image enhancement processing technique configured to transform the one or more sets of wavelet coefficients into a set of modified wavelet coefficients representing one or more enhanced images; and
      transform the set of modified wavelet coefficients into one or more enhanced images,
      wherein the two or more image enhancement processing techniques include a parallax-correcting image registration technique in conjunction with two or more images, the parallax-correcting image registration technique performed by applying one or more registration algorithms to low frequency coefficients of the two or more images to provide a coarse registration and using high frequency coefficients of the two or more images to refine the coarse registration, and leveraging high frequency coefficients of the two or more images as weights to guide and select appropriate coefficients to construct an output image, wherein larger coefficients of the two or more images are chosen to ensure more detailed image data is captured in the constructed output image.

2. The system of claim 1 where the decomposition processor is encompassed in the at least one processor.

3. The system of claim 1 where the at least one processor comprises a single general purpose processor, a multicore processor, or a hardware implementation.

4. The system of claim 1 where the at least one processor is a single processor that uses two or more temporal phases to perform the transforms on the one or more sets of wavelet coefficients.

5. The system of claim 1 where the at least one processor includes multiple processors that simultaneously perform the transforms on the one or more sets of wavelet coefficients.

6. The system of claim 1 wherein the two or more image enhancement processing techniques are used to process image frames collected from sensors include visible, low light, and infrared sensors.

7. The system of claim 1, wherein the decomposition processor further decomposes the low frequency data set recursively until only a single pixel remains in the low frequency data set.

8. The system of claim 1, wherein the two or more image enhancement processing techniques further provide processing techniques selected from a group comprising noise reduction, distortion correction, feature recognition, contrast enhancement, multi-spectral fusion, multi-focus fusion (hands free focus), super-resolution, dynamic range compression, and deblurring algorithm.

9. An image enhancement method, the enhancement method comprising:
  decomposing, by at least one processor, data from one or more images using a discrete wavelet transform, the data from the one or more images being decomposed into one or more sets of wavelet coefficients, the one or more sets of wavelet coefficients comprising a low frequency data set of wavelet coefficients that retains essential image information of the one or more images and one or more high frequency data sets of wavelet coefficients that represent gradient between adjacent pixels of the one or more images;
  storing, by the at least one processor, the one or more sets of wavelet coefficients in a memory;
  applying, by the at least one processor, two or more image enhancement processing techniques to provide processing enhancements to at least one of the one or more images, the two or more image enhancement processing techniques including one frequency-based image enhancement processing technique configured to transform the one or more sets of wavelet coefficients into a set of modified wavelet coefficients representing one or more enhanced images; and
  transforming, by the at least one processor, the set of modified wavelet coefficients into one or more enhanced images,
  wherein the two or more image enhancement processing techniques include a parallax-correcting image registration technique in conjunction with two or more images, the parallax-correcting image registration technique performed by applying one or more registration algorithms to low frequency coefficients of the two or more images to provide a coarse registration and using high frequency coefficients of the two or more images to refine the coarse registration, and leveraging high frequency coefficients of the two or more images as weights to guide and select appropriate coefficients to construct an output image, wherein larger coefficients of the two or more images are chosen to ensure more detailed image data is captured in the constructed output image.

10. The method of claim 9 where the memory is a random access memory.

11. The method of claim 9 where the two or more image enhancement processing techniques are performed on a single general purpose processor, a multicore processor, or a hardware implementation.

12. The method of claim 9 where the two or more image enhancement processing techniques are performed on a single processor or hardware unit and use two or more temporal phases to transform the one or more sets of wavelet coefficients.

13. The method of claim 9 where the two or more image enhancement processing techniques are performed on multiple processors or hardware units to simultaneously transform the one or more sets of wavelet coefficients.

14. The method of claim 9 where the two or more image enhancement processing techniques process image frames collected from sensors include visible, low light, and infrared sensors.

15. The method of claim 9, wherein the decomposing step further decomposes the low frequency data set recursively until only a single pixel remains in the low frequency data set.

16. The method of claim 9, wherein the two or more image enhancement processing techniques further provide processing techniques selected from a group comprising noise reduction, distortion correction, feature recognition, contrast enhancement, multi-spectral fusion, multi-focus fusion (hands free focus), super-resolution, dynamic range compression, and deblurring algorithm.

17. An image processing system, the system comprising:
  a processor; and
  a memory coupled to the processor,
  the processor configured to:
    decompose data from one or more images into one or more sets of wavelet coefficients using a discrete wavelet transform, the one or more sets of wavelet coefficients comprising a low frequency data set of wavelet coefficients that retains essential image information of the one or more images and one or more high frequency data sets of wavelet coefficients that represent gradient between adjacent pixels of the one or more images;
    store the one or more sets of wavelet coefficients in the memory;
    apply two or more image enhancement processing techniques to provide processing enhancements to at least one of the one or more images, the two or more image enhancement processing techniques including one frequency-based image enhancement processing technique configured to transform the one or more sets of wavelet coefficients into a set of modified wavelet coefficients representing one or more enhanced images; and
    transform the set of modified wavelet coefficients into one or more enhanced images,
    wherein the two or more image enhancement processing techniques include a parallax-correcting image registration technique in conjunction with two or more images, the parallax-correcting image registration technique performed by applying one or more registration algorithms to low frequency coefficients of the two or more images to provide a coarse registration and using high frequency coefficients of the two or more images to refine the coarse registration, and leveraging high frequency coefficients of the two or more images as weights to guide and select appropriate coefficients to construct an output image, wherein larger coefficients of the two or more images are chosen to ensure more detailed image data is captured in the constructed output image.

18. The system of claim 17 where the processor comprises a single general purpose processor, a multicore processor, or a hardware implementation and the processor uses two or more temporal phases to perform the transforms on the one or more sets of wavelet coefficients to process image frames collected from sensors including visible, low light, and infrared sensors.

* * * * *